(12) United States Patent
Autran et al.

(10) Patent No.: US 9,213,364 B2
(45) Date of Patent: Dec. 15, 2015

(54) MAN/MACHINE INTERFACE HAVING A REINFORCED HOUSING

(75) Inventors: Frédéric Autran, Paris (FR); Henry Beraud, Vincennes (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 25 days.

(21) Appl. No.: 13/642,274

(22) PCT Filed: Apr. 20, 2011

(86) PCT No.: PCT/FR2011/000240
§ 371 (c)(1),
(2), (4) Date: Mar. 6, 2013

(87) PCT Pub. No.: WO2011/131865
PCT Pub. Date: Oct. 27, 2011

(65) Prior Publication Data
US 2013/0176240 A1     Jul. 11, 2013

(30) Foreign Application Priority Data
Apr. 21, 2010    (FR) ..................................... 10 53043

(51) Int. Cl.
*G06F 3/041*     (2006.01)
*G06F 1/16*     (2006.01)
*G06F 3/0354*     (2013.01)

(52) U.S. Cl.
CPC .......... *G06F 1/1601* (2013.01); *G06F 3/03547* (2013.01); *G06F 3/041* (2013.01)

(58) Field of Classification Search
CPC .... G06F 3/041; G06F 3/1601; G06F 3/03547

USPC ............... 345/169–179; 29/525.02, 622, 874, 29/884; 361/679.09; 704/9; 715/848
See application file for complete search history.

(56) References Cited

U.S. PATENT DOCUMENTS

| | | | | |
|---|---|---|---|---|
| 2,950,506 | A | * | 8/1960 | Corsi ............................ 264/161 |
| 3,468,171 | A | * | 9/1969 | Maclelinski .................. 277/634 |
| 4,915,585 | A | * | 4/1990 | Guimbal ....................... 416/140 |
| 6,269,565 | B1 | * | 8/2001 | Inbar et al. ....................... 40/361 |
| 6,844,872 | B1 | * | 1/2005 | Farag et al. ................... 345/163 |
| 6,965,375 | B1 | | 11/2005 | Gettemy et al. |
| 6,977,694 | B2 | * | 12/2005 | Natsuyama ..................... 349/60 |
| 7,348,964 | B1 | | 3/2008 | Gettemy et al. |

(Continued)

FOREIGN PATENT DOCUMENTS

| | | |
|---|---|---|
| JP | 2007026344 A | 2/2007 |
| JP | 2009-140038 A | 6/2009 |
| JP | 2009-146354 A | 7/2009 |

OTHER PUBLICATIONS

International Search Report w/translation issued in PCT/FR2011/000240 mailed Aug. 19, 2011 (6 pages).

(Continued)

*Primary Examiner* — Prabodh M Dharia
(74) *Attorney, Agent, or Firm* — Osha Liang LLP

(57) ABSTRACT

A man/machine interface including a touch-sensitive detection means and a housing is disclosed. The housing may include an edge which defines an opening. The touch-sensitive detection means may be placed into the housing at least in line with the opening, and the housing includes at least one reinforcement means.

12 Claims, 4 Drawing Sheets

(56) References Cited

U.S. PATENT DOCUMENTS

Figure 1:
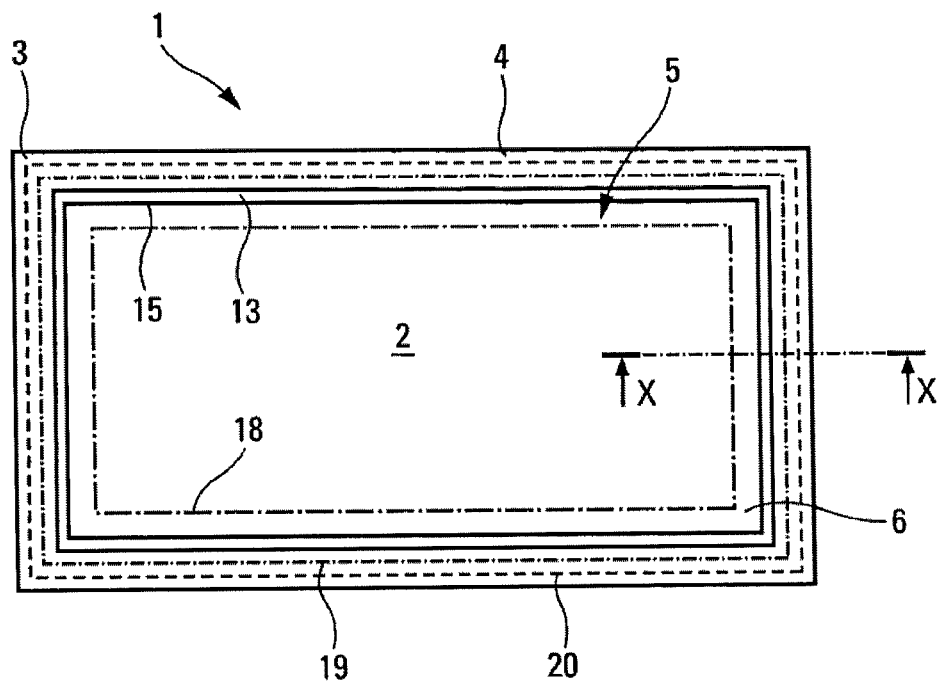

| | | | |
|---|---|---|---|
| 7,479,946 B2* | 1/2009 | Fitch et al. .................... 345/173 |
| 7,716,805 B2* | 5/2010 | Hommel .................... 29/525.02 |
| 8,228,298 B2* | 7/2012 | Benali-Khoudja et al. ... 345/173 |
| 2002/0063812 A1* | 5/2002 | Natsuyama .................... 349/58 |
| 2002/0190853 A1* | 12/2002 | Nigon et al. .................... 340/448 |
| 2006/0174258 A1* | 8/2006 | Kurita et al. .................... 720/740 |
| 2007/0030254 A1 | 2/2007 | Robrecht et al. |
| 2008/0246737 A1* | 10/2008 | Benali-Khoudja et al. ... 345/173 |
| 2008/0259026 A1* | 10/2008 | Zeldin et al. .................... 345/157 |
| 2008/0282279 A1* | 11/2008 | Kurita et al. .................... 720/725 |
| 2009/0180244 A1* | 7/2009 | Kiyohara ................. 361/679.01 |
| 2009/0323262 A1* | 12/2009 | Arita ........................ 361/679.01 |
| 2010/0046179 A1* | 2/2010 | Arita .............................. 361/752 |
| 2010/0060604 A1* | 3/2010 | Zwart et al. .................... 345/173 |
| 2010/0061040 A1 | 3/2010 | Dabov et al. |
| 2010/0066682 A1 | 3/2010 | Tseng et al. |
| 2010/0090962 A1* | 4/2010 | Yoo et al. ....................... 345/170 |
| 2011/0069439 A1* | 3/2011 | Song ........................ 361/679.09 |
| 2011/0255218 A1* | 10/2011 | Pakula .................. G06F 1/1626 361/679.01 |
| 2012/0071092 A1* | 3/2012 | Pasquero et al. ............. 455/41.2 |
| 2012/0072103 A1* | 3/2012 | Backman ...................... 701/400 |
| 2012/0103773 A1* | 5/2012 | Villain ............... G06F 3/03547 200/344 |
| 2013/0174415 A1* | 7/2013 | Guenin ............ B29C 45/14065 29/622 |
| 2013/0287982 A1* | 10/2013 | Dotson ........................ 428/35.8 |
| 2014/0068917 A1* | 3/2014 | Kopf et al. ....................... 29/445 |
| 2014/0085258 A1* | 3/2014 | Beraud ................. B60K 37/00 345/174 |

OTHER PUBLICATIONS

Japanese Office Action issued in corresponding Japanese Application No. 2013-505518, mailed Jan. 27, 2015 (11 pages).

* cited by examiner

MAN/MACHINE INTERFACE HAVING A REINFORCED HOUSING

The technical sector of the present invention is that of onboard touch-sensitive sensing devices in a man/machine interface. These touch-sensitive sensing devices are used at present in many sectors such as home automation, information technology hardware and equipment control systems in general. The invention is more particularly directed to the application of such devices to motor vehicles. In this field, the devices commonly called man/machine interfaces are vehicle equipment display and control devices. This type of man/machine interface is found in the passenger compartment of the vehicle for controlling the navigation system, the audio or multimedia system or the air conditioning system.

In a prior art device a screen is installed in a housing, the latter featuring an opening. The screen has a top face on which a sensor is placed in line with the opening. The opening is bordered by a perimeter of the housing, said perimeter covering a great deal of the sensor and forming a shoulder at the intersection of the sensor and the perimeter.

Such an arrangement has numerous drawbacks. One of the main drawbacks is that the perimeter forms an additional thickness relative to the top part of the sensor, which compromises the general esthetics of the device. For esthetic reasons it is increasingly required that the overall surface of the man/machine interface visible to the user is as smooth and uniform as possible and it is obvious that any such additional thickness between the sensor and the housing goes against this smooth and uniform character. This is the consequence of the use of materials with different expansion properties. The sensor is primarily constituted of glass whereas the casing is generally plastic. The coefficients of expansion being different, it is not possible to maintain a constant clearance in all circumstances, as demanded by a high level of finish in vehicle interiors. This is why prior art devices propose an overlap between the sensor and the perimeter whilst leaving a functional clearance, which creates the drawbacks referred to above.

There is therefore a requirement to form a man/machine interface having a smooth and uniform facade, of economical design but having no abnormal clearances or cracks at the periphery of the touch-sensitive sensor.

The object of the present invention is therefore to remove the drawbacks described above, principally by reinforcing the chassis or housing so as to prevent the differences in thermal expansion that would be liable to cause clearances, gaps or cracks that are unesthetic from the point of view of the user of the man/machine interface.

The subject matter of the invention is therefore a man/machine interface including a touch-sensitive sensing means and a housing, said housing including a rim delimiting an opening, said touch-sensitive sensing means being housed in the housing at least in line with said opening, innovative in that the housing includes at least one reinforcing means. By "reinforcing means" is meant a structural element forming part of or integrated into the housing and adapted to reinforce the mechanical strength of the housing so that it expands in the same way as the touch-sensitive sensing device when they are subjected to high temperatures.

According to a first feature of the invention, the material constituting the touch-sensitive sensing means and the material constituting the reinforcing means have the same coefficient of expansion ±33%. This ensures that movements consequent upon temperature differences are homogeneous so as to prevent the housing warping for example.

According to a second feature of the invention, the reinforcing means is a metal plate, advantageously a steel plate, which confers on the housing the mechanical strength necessary to resist the thermal and mechanical stresses present in a motor vehicle passenger compartment (between −40° C. and +105° C.)

According to another feature of the invention, the reinforcing means includes a first part embedded in said housing. By "embedded" is meant molded or overmolded so as to ensure a perfect mechanical connection between the reinforcing means and the housing.

According to a further feature of the invention, the reinforcing means includes a second part that protrudes from the housing at the level of said opening. This second part enables the reinforcing means to fulfill a function of retaining and fixing the touch-sensitive sensing means.

According to a further feature of the invention, the first part and the second part lie in a first plane and a second plane, respectively, said planes being at an angle between 75° and 105°, advantageously 90°. This conformation of the reinforcing means enables mechanical reinforcement of the housing and retention of the touch-sensitive panel or touch-sensitive sensing means to be ensured with a single part.

The housing advantageously includes a multiplicity of separate reinforcing means. The housing alternatively includes a single reinforcing means.

In the latter case the reinforcing means includes a hole delimited by said second part, said touch-sensitive sensing means being fastened to said second part in line with the hole.

According to another feature of the invention, said second part has an upper face oriented toward a user and a lower face opposite the upper face, said touch-sensitive sensing means being fastened to said upper face of the second part of the reinforcing means.

Alternatively, said touch-sensitive sensing means are fastened to said lower face of the second part of the reinforcing means.

According to a further feature of the invention the rim of the housing includes a facade strip, the upper face of the reinforcing means and the facade strip being in the same plane. This arrangement guarantees a smooth and uniform finish of the visible face of the man/machine interface.

According to a further feature of the invention, the touch-sensitive sensing means include an upper face oriented toward a user, the rim of the housing includes the facade strip, and said upper facade and said facade strip are in the same plane.

Leveling packing is advantageously disposed between the rim of the housing and the touch-sensitive sensing means.

Finally, the housing includes an area for receiving the touch-sensitive sensing means. The housing thus fulfills the function of retaining the sensing means and the reinforcing means fulfils its function of mechanical reinforcement of the housing.

A first advantage of the invention lies in the possibility of implementing a man/machine interface that has a smooth and pleasant to touch facade using economical technical means.

Another advantage lies in the possibility of guaranteeing perfect mechanical retention in the face of thermal and mechanical stresses on the man/machine interface using means that are simple to implement.

Figure 2:
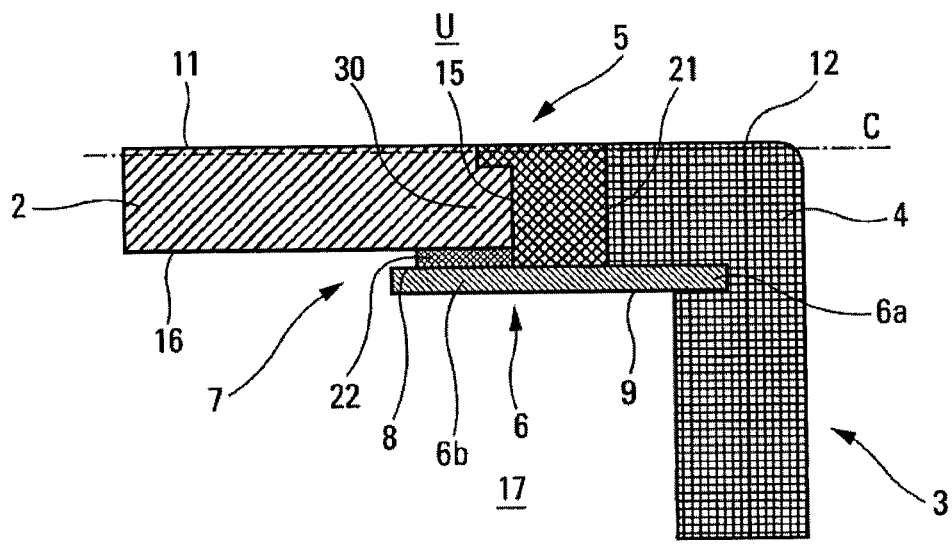
Figure 3:
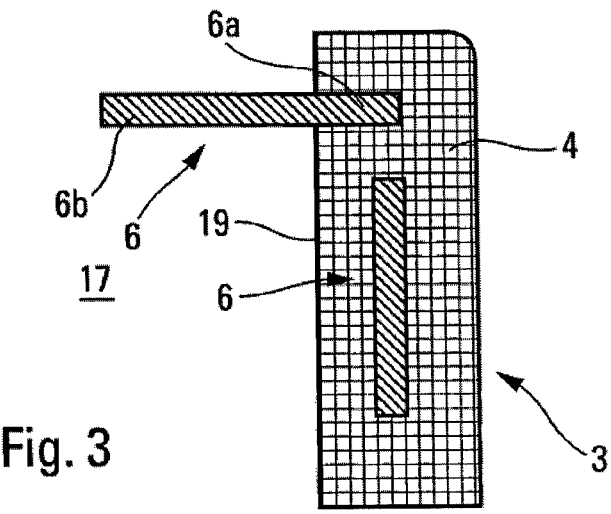
Figure 4:
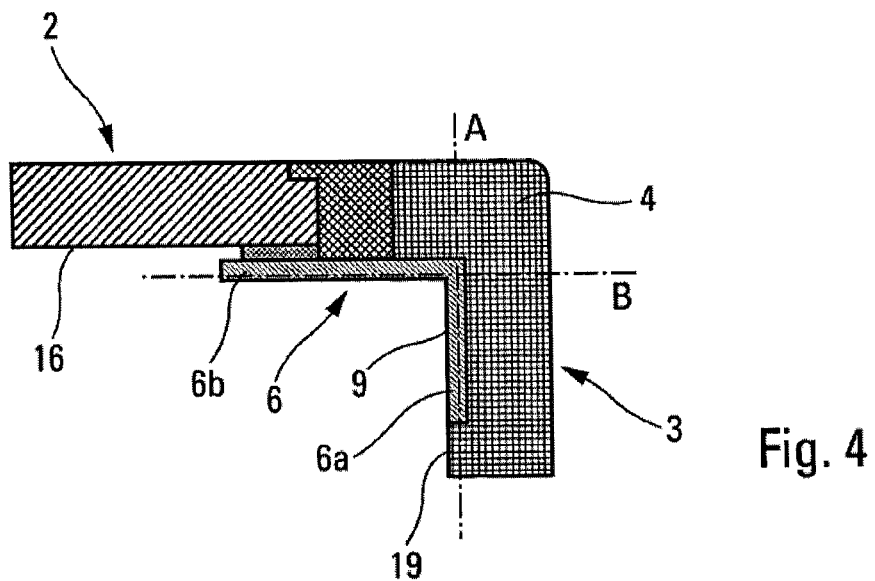
Figure 5:
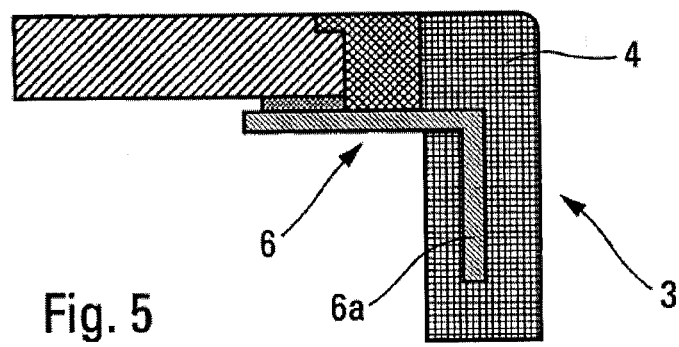
Figure 6:
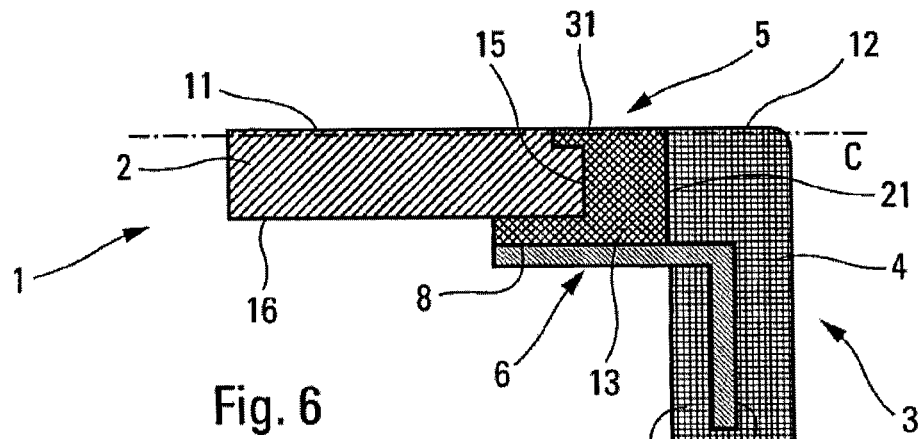
Figure 7:
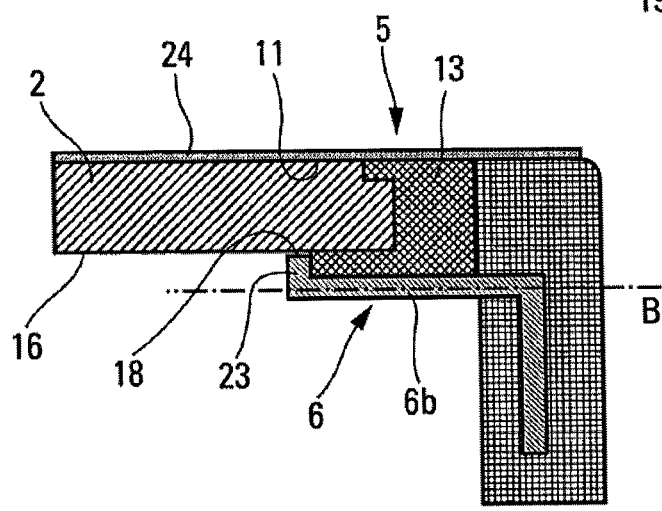
Figure 8:
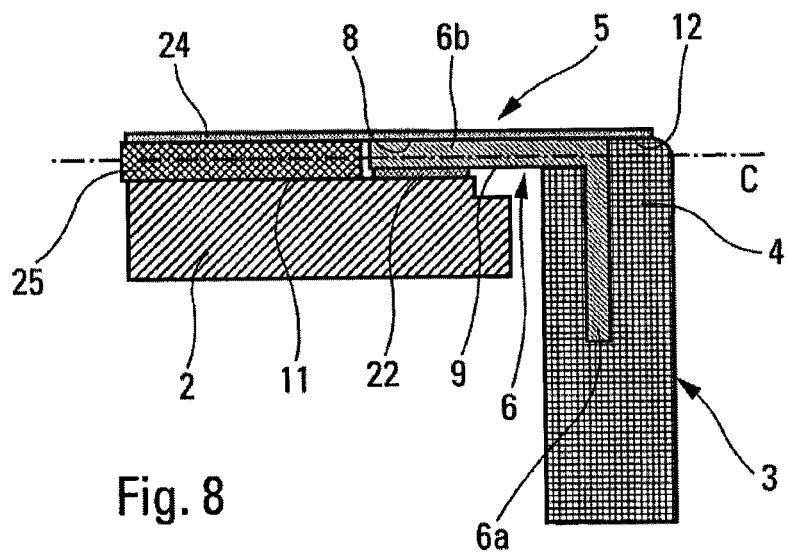
Figure 9:
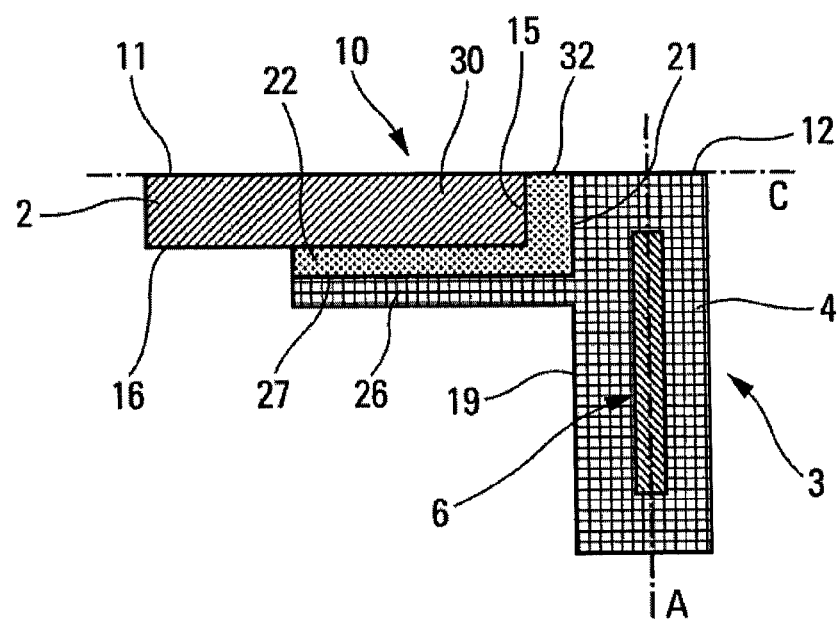

Other features, details and advantages of the invention will become more clearly apparent on reading the description given hereinafter by way of illustration and with reference to the drawings, in which:

FIG. 1 is a front view of the man/machine interface according to the invention,

FIG. 2 is a section taken along the line X-X in FIG. 1 showing a first variant of the invention, FIG. 3 is a section taken along the line X-X showing a detail of a second variant of the invention, FIG. 4 is a section taken along the line X-X in FIG. 1 showing a third variant of the invention, FIG. 5 is a section taken along the line X-X in FIG. 1 showing a fourth variant of the invention, FIG. 6 is a section taken along the line X-X in FIG. 1 showing a fifth variant of the invention, FIG. 7 is a section taken along the line X-X in FIG. 1 showing a sixth variant of the invention, FIG. 8 is a section taken along the line X-X in FIG. 1 showing an alternative way of fixing the touch-sensitive sensing means, FIG. 9 shows a variant of the invention.

It should be noted that the figures illustrate the invention in detail; said figures may of course serve better to define the invention where necessary.

FIG. 1 represents a diagrammatic front view of a man/machine interface 1 for motor vehicles. Such an interface 1 is fixed in the vicinity of a user, for example on a central console of the vehicle or on the dashboard, to control functions or equipment of the vehicle. These are for example the ventilation, heating and/or air conditioning installation, an audio system, a telephone system, a multimedia system or a navigation system.

The man/machine interface 1 includes a housing 3 of rectangular shape inside which a touch-sensitive sensing means 2 is installed. An opening 5 is formed in the housing so as to render the touch-sensitive sensing means 2 accessible to the user. This opening 5 is delimited by a rim 4 of the housing 3, this rim 4 extending peripherally around the whole of the opening 5. Leveling packing 13 is disposed between the rim 4 of the housing and a peripheral strip 15 of the touch-sensitive sensing means 2.

The housing 3 includes an internal recess in which are installed elements complementary to the interface. In a preferred example, a display device (not represented) is installed in the recess formed in the housing 3. The technology employed by the display device is for example a backlit screen, an LCD screen, a plasma screen and any single-function screen in general, such as, for example, an air conditioning or multifunction control panel, i.e. a panel displaying a multiplicity of information such as navigation, audio system, thermal management of the passenger compartment of the vehicle, for example.

The touch-sensitive sensing means 2 comprises a transparent resistive or capacitive sensor. In the case of a resistive sensor, it consists of a main plate and a secondary plate. These two plates are glass plates, the secondary plate being thinner than the main plate. The secondary plate has the function of deforming when a pressure force is exerted by the finger of the user, while the main plate is less deformable, its thickness being such that it does not flex because of the effect of pressure exerted by the finger of a user. The sensor is thus able to detect the position of the finger of the user thanks to an array of conductors placed between the main plate and the secondary plate, for example in a horizontal and vertical arrangement. The touch-sensitive sensing means 2 is electrically connected to an electronic circuit card by means of a multiconductor flexible cable, the electronic circuit card interpreting the sensing effected by the touch-sensitive sensing means 2.

According to the invention, the housing 3 includes a reinforcing means 6 variants of which will be described in more detail hereinafter. The interior dashed line shows an interior strip 18 of the reinforcing means, the next dashed line in the direction toward the exterior of the interface shows an internal wall 19 of the housing 3, and, finally, the last dashed line shows a first part of the reinforcing means 6, more particularly an exterior edge 20 of the reinforcing means 6.

FIG. 2 shows a partial section of the man/machine interface of the invention taken along the section line X-X shown in FIG. 1. The touch-sensitive sensing means 2 has an upper facade 11 oriented toward the user U and a lower facade 16 facing toward the internal recess 17 formed in the housing 3. The latter housing has an inverted L-shaped section and the reinforcing means 6 is integrated into the plastic material that forms the housing 3. The housing 3 is advantageously molded over the reinforcing means 6 by a method in which the reinforcing means are installed in a mold into which the plastic material of the housing is injected in the liquid state to solidify over a first part 6a of the reinforcing means 6. This first part 6a is an exterior border that may include holes (not represented) enabling the plastic material to pass through the reinforcing means and thereby enhance the mechanical connection between the reinforcing means 6 and the housing 3.

The material of the reinforcing means 6 is chosen from materials having the same coefficient of expansion as the material constituting the touch sensitive sensing means 2 ±33%. If the latter is made primarily from glass, the coefficient of expansion of the glass is equal to $9 \times 10^{-6}$/K which authorizes a choice of materials for the reinforcing means the coefficient of expansion of which is at most $12 \times 10^{-6}$/K. This applies to steel and this is why it is a simple matter to reinforce the housing 3 by embedding a metal plate in it, for example a steel plate.

The rim 4 of the housing delimits the opening 5 in which the touch-sensitive sensing means 2, otherwise called the touch-sensitive sensor or touch-sensitive panel, is placed. An edge 21 borders the opening 5 and this edge is terminated by a contact on the reinforcing means 6.

In the FIG. 2 example, the reinforcing means takes the form of a plane metal plate between 0.20 and 0.50 mm thick. In addition to the first part 6a of the reinforcing means embedded in or molded into the housing 3, this metal plate includes a second part 6b that protrudes into the internal volume delimited by the housing or in other words in the recess 17. This second part 6b lies in the opening 5 and serves as a support for the touch-sensitive sensing means 2.

In the FIG. 2 example, the metal plate forming the reinforcing means 6 includes a hole 7 delimited or bordered by the second part 6b of the reinforcing means. In such a case, the single reinforcing means for the man/machine interface of the invention has a rectangular general shape with the hole 7 at its center. The latter hole enables light rays from the illumination device to pass through the touch-sensitive sensing means 2 so as to render the information displayed by the display device visible to the user.

The touch-sensitive sensing means 2 includes a border 30 terminated by the peripheral edge 15. This border 30 is an area for fixing or fastening the touch-sensitive sensing means 2 to the reinforcing means 6. To be more specific, fixing is operative between the lower facade 16 of the touch-sensitive sensing means 2, in line with the border 30, and an upper face 8 of the reinforcing means 6 oriented toward a user. Fixing is effected by means of a spot of glue or a strip of glue 22 placed between the lower facade 16 of the touch-sensitive sensing means 2 and the upper face 8 of the reinforcing means 6. Opposite this upper face 8, the reinforcing means 6 have a lower face 9 which for its part is oriented toward the recess 17 of the housing 3.

It will particularly be noted that the upper facade 11 of the touch-sensitive sensing means 2, i.e. that which faces the user, is aligned in the same plane C as a facade strip 12 of the rim 4 of the housing 3 that also faces the user. This ensures that the face visible to the user of the man/machine interface is perfectly smooth to the touch.

In this variant, the first part 6a and the second part 6b of the reinforcing means 6 lie in the same plane parallel to the plane C.

The man/machine interface of the invention includes the leveling packing 13 around the touch-sensitive panel or touch-sensitive sensing means 2 for filling the space delimited by the edge 21 of the rim 4, the upper face 8 of the reinforcing means 6 and the peripheral edge 15 of the touch-sensitive sensing means 2. This guarantees smooth continuity of the control surface of the touch-sensitive sensing means 2 with the rim 4 of the housing 3.

Accordingly, the leveling packing 13 around and within the thickness of the touch-sensitive sensing means 2 levels the touch-sensitive sensing means 2 with the rim of the housing 3 so that the user perceives only one surface that is smooth and uniform to the touch, without sharp edges or bulges, the sliding of the finger over the frontier between the touch-sensitive sensing means 2 and the rim 4 of the housing 3 being imperceptible and moreover possibly being rendered invisible by the choice of colors used, giving the impression of a continuous surface. A material is chosen for the leveling packing 13 that can be cast or injected at low pressure and at low temperature, like an elastomer, such as an EPDM (ethylene propylene diene monomer) material, a TPE (thermoplastic elastomer, e.g. SEBS (styrene-ethylene-butylene-styrene), SBS (styrene-butadiene-styrene) or TPU (thermoplastic polyurethane)) material or a silicone elastomer. Once polymerized, these materials become rigid, offering a finish smooth to the touch.

FIG. 3 shows a variant of the invention that employs a multiplicity of reinforcing means 6. By multiplicity is meant at least two metal plates oriented orthogonally to each other but there may also be a multiplicity of separate metal plates placed on each side of the rectangle formed by the housing 3 (see FIG. 1).

In FIG. 3, first reinforcing means 6 are wholly embedded in the plastic material constituting the housing 3 and second reinforcing means 6 are installed in the upper part of the rim 4, a first part 6a of the reinforcing means 6 being molded into or embedded in the material constituting the housing 3 while a second part 6b projects from the internal wall 19 of the housing in the direction of the recess 17.

FIG. 4 shows a variant of the reinforcing means 6. Here, the metal plate forming the reinforcing means 6 is conformed so that its first part 6a is oriented at an angle to its second part 6b although they form only one part. In this embodiment, the first part 6a and the second part 6b respectively lie in a first plane A and a second plane B at an angle of 90°. Without departing from the scope of the invention, said planes A and B may be at an angle between 75° and 105°, what is important being that the second part 6b of the reinforcing means is parallel to the lower facade 16 of the touch-sensitive sensing means 2 and that the first part 6a of the reinforcing means 6 is entirely contained or embedded in the rim 4 of the housing 3.

FIG. 4 shows another difference compared to the FIG. 2 embodiment. The first part 6a is embedded in the rim 4 at the level of the internal wall 19 so that the lower face 9 of the reinforcing means 6 is flush with the internal wall 19 once the reinforcing means 6 is fastened to the rim 4 of the housing 3. In a situation of this kind, the lower face 9 at the level of the first part 6a can be seen inside the housing 3.

FIG. 5 shows a variant similar to that shown in FIG. 4. The difference lies in the fact that the first part 6a of the reinforcing means 6 is entirely embedded in the plastic material constituting the rim 4 of the housing 3. It will particularly be noted that the first part 6a is embedded substantially at the center of the thickness of the rim 4 forming the housing 3. The rest of the FIG. 5 embodiment is identical to the FIG. 4 embodiment.

FIG. 6 shows a variant in which the leveling packing also has the function of fastening the touch-sensitive sensing means 2 to the reinforcing means 6. The first part 6a of the reinforcing means 6 is entirely embedded in the plastic material constituting the rim 4 of the housing 3 while the second part 6b projects or protrudes from the internal wall 19 of the housing in the direction of the recess 17, substantially at the level of the opening 5. In this variant, the leveling packing 13 has adhesive properties so as to bond the lower facade 16 of the touch-sensitive sensing means 2 and the upper face 8 of the second part 6b of the reinforcing means 6. To this end, the leveling packing is inserted between these two walls and bonds them. The leveling packing 13 therefore fills the space delimited by the edge 21 of the rim 4, the upper face 8 of the reinforcing means 6, the peripheral edge 15 of the touch-sensitive sensing means 2 and the lower facade 16 of those means, where it provides its bonding function. Of course, the upper facade 11, an upper face 31 of the leveling packing and the facade strip 12 of the rim 4 are contained in the same plane C so as to guarantee the smooth and uniform character of the man/machine interface 1.

FIG. 7 shows a variant complementary to that shown in FIG. 6. As the leveling packing 13 is injected in the liquid state, the invention proposes to bend the second part 6b of the reinforcing means 6 so as to form a cradle containing the leveling packing before it solidifies. The second part 6b therefore has at its free end a bend 23 substantially perpendicular to the second plane B in which the second part 6b lies and oriented in the direction of the upper facade 11 of the touch-sensitive sensing means 2. The interior edge 18 of the reinforcing means 6 is thus in contact with the lower facade 16 of the touch-sensitive sensing means 2.

To guarantee a smooth and uniform finish of the interface 1, a film 24 is disposed on the upper facade of the touch-sensitive sensing means 2 so as to cover the opening 5, the leveling packing 13 and the rim 4 of the housing 3. This film extends over the whole surface of the man/machine interface, and it is thus clear that the dimensions of the film 24 and the dimensions of the interface 1 are similar or even identical. This film therefore forms a totally smooth and uniform surface to the touch for the user.

The film 24 is a transparent film that may have a single property or a combination of properties. A first property is linked to the decorative character of this film. It is then easy to define a particular shape visible to the user. The film 24 may also have non-scratch properties so as to prevent scratches appearing on the surface of the man/machine interface. The film may also have an anti-reflection and diffusing property, imparting a matt finish to the man/machine interface and preventing mirror effects that are a nuisance for the user. The anti-reflection property prevents incident light emerging from the surface. This is a thin layer treatment. The film may also include diffusion properties obtained by slight graining which breaks up incident light by reflecting it in all directions. Finally, the film 24 may have polarizing properties, i.e. it may be able to block light reflected by the glass plates of the touch-sensitive sensing means in a given direction.

In FIG. 8, the rim 4 of the housing 3 includes the facade strip 12 constituted by the wall of the rim 4 oriented toward the user. The first part 6a is embedded or molded in the rim 4 of the housing 3 and the second part 6b of the reinforcing means 6 projects or protrudes from the rim 4 at the level of the opening 5.

It will be noted first of all that the upper face 8 of the reinforcing means 3, at the level of its second part 6b, lies in the same plane C as the facade strip 12. It is thus clear that the upper face 8 is flush with the facade strip 12.

The method of fixing the touch-sensitive sensing means is different compared to the variants described above. The touch-sensitive sensing means 2 is fixed to the lower face 9 of the reinforcing means 6. Any means for fastening two parts together may be used. Advantageously, a bead or spots of glue 22 make the mechanical connection between the upper facade 11 of the touch-sensitive sensing means and the lower face 9 of the metal plate forming the means reinforcing the housing but also a support for the touch-sensitive sensing means. Alternatively, the spots of glue may be replaced or complemented by an adhesive strip. This enables touch-sensitive sensing means to be assembled into the man/machine interface in a "suspended" mode.

A packing element 25, the objective of which is to define conjointly with the upper face 8 of the reinforcing means 6 a plane and smooth surface, is added at the level of the opening 5, bearing against the upper facade 11 of the touch-sensitive sensing means. The packing element 25 is a transparent flexible film produced from a strip of polycarbonate or polyethylene terephthalate (PET) and its thickness is equal to the sum of the thickness of the reinforcing means 6, especially at the level of its second part 6b, and the thickness of the glue 22. A film 24 is deposited on the packing element 25, on the upper face of the reinforcing means 6, at the level of its second part 6b, and finally on the facade strip 12.

In the above embodiments, the reinforcing means provide a primary function, which is to reinforce the mechanical strength of the rim of the housing, and a secondary function, which is to support the touch-sensitive sensing means. In the FIG. 9 variant, these functions are dissociated. The reinforcing means does not support the touch-sensitive sensing means, this function being devolved on the housing 3. To this end, the housing 3 includes a shoulder 26 that receives the touch-sensitive sensing means 2 and more particularly its border 30. This shoulder 23 upstands on the internal wall 19 in the direction of the internal recess 17. The direction in which the shoulder 26 extends is thus substantially perpendicular to the direction A in which the reinforcing means 6 entirely embedded in the rim 4 of the housing 3 extends. The shoulder 26 and the edge 21 of the opening 5 delimit an area 10 for receiving the border 20 of the touch-sensitive sensing means 2. A strip of glue 22 is disposed between the lower facade 16 of the touch-sensitive sensing means 2 and a wall 27 of the shoulder oriented toward the receiving area 10, as well as between the edge 21 and the peripheral edge 15 of the touch-sensitive sensing means 2. In this variant, the housing receives and retains the touch-sensitive sensing means and is reinforced by a metal plate entirely embedded in the rim of the housing. As for the variants of FIGS. 1 to 7, the upper facade 11 of the touch-sensitive sensing means 2, i.e. that facing the user, an upper edge 32 of the strip of glue 22 and the facade strip 12 of the rim 4 are contained in the same plane C so as to guarantee the smooth and uniform character of the man/machine interface 1. This ensures that the face of the man/machine interface visible to the user is perfectly smooth to the touch.

The invention claimed is:

1. A man/machine interface, comprising:
   a touch-sensitive sensing means; and
   a housing comprising a rim delimiting an opening, said touch-sensitive sensing means being housed in the housing at least in line with said opening, wherein the housing includes at least one reinforcing means,
   wherein the at least one reinforcing means comprises a first part embedded in said rim of the housing; and
   the housing comprises a single reinforcing means, wherein the single reinforcing means comprises a hole delimited by said second part, said touch-sensitive sensing means being fastened to said second part in line with the hole.

2. The interface as claimed in claim 1, wherein a material constituting the touch-sensitive sensing means and a material constituting the reinforcing means have a same coefficient of expansion ±33%.

3. The interface as claimed in claim 1, wherein the reinforcing means is a metal plate.

4. The interface as claimed in claim 1, wherein the reinforcing means includes a second part that protrudes from the rim at the level of said opening.

5. The interface as claimed in claim 4, wherein the first part and the second part lie in a first plane and a second plane, respectively, said planes being at an angle between 75° and 105°.

6. The interface as claimed in claim 1, wherein the housing includes a multiplicity of separate reinforcing means.

7. The interface as claimed in claim 1, wherein said second part has an upper face oriented toward a user and a lower face opposite the upper face, said touch-sensitive sensing means being fastened to said upper face of the second part of the reinforcing means.

8. The interface as claimed in claim 1, wherein said second part has an upper face oriented toward a user and a lower face opposite the upper face, said touch-sensitive sensing means being fastened to said lower face of the second part of the reinforcing means.

9. The interface as claimed in claim 8, wherein the rim of the housing includes a facade strip and the upper face of the reinforcing means and the facade strip are in the same plane.

10. The interface as claimed in claim 1, wherein the touch-sensitive sensing means includes an upper face oriented toward a user, the rim of the housing includes a facade strip, and said upper facade and said facade strip are in a same plane.

11. The interface as claimed in claim 10, wherein leveling packing is disposed between the rim of the housing and the touch-sensitive sensing means.

12. The interface as claimed in claim 1, wherein the housing includes an area for receiving the touch-sensitive sensing means.

* * * * *